E. FORNANDER.
METHOD OF AND MEANS FOR REDUCING ORES IN ELECTRIC BLAST FURNACES.
APPLICATION FILED APR. 14, 1922.
1,430,971.
Patented Oct. 3, 1922.
2 SHEETS-SHEET 1.
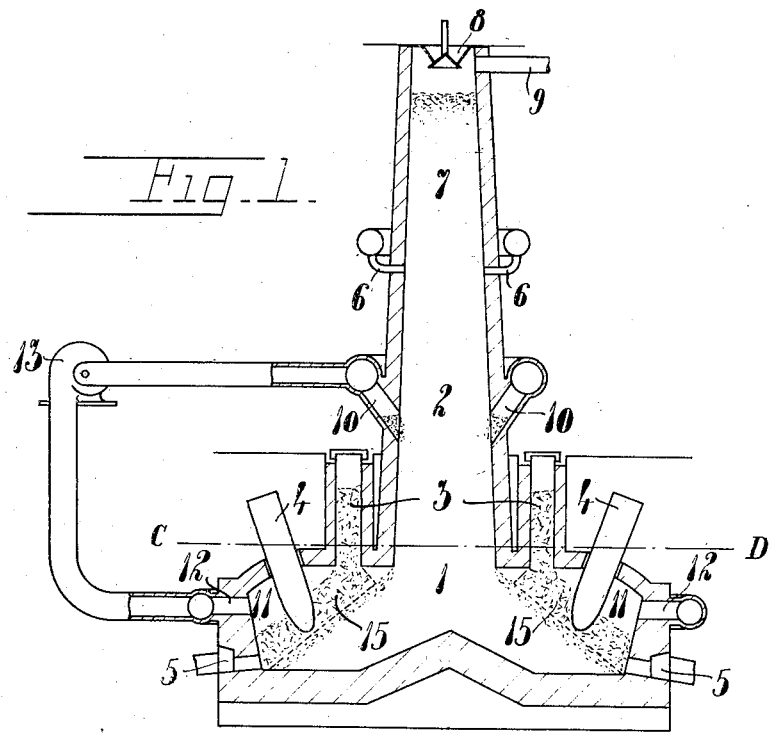
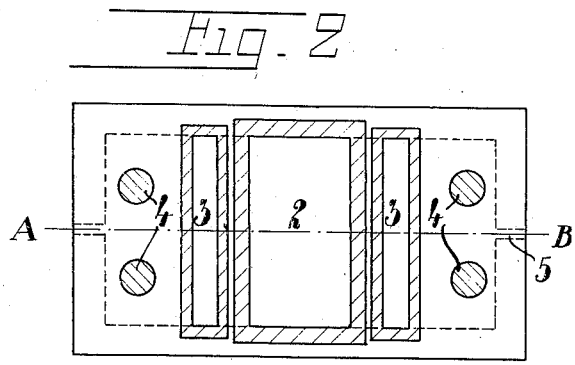
Inventor
Edvin Fornander,
by James J. Keehn & Co,
attys.

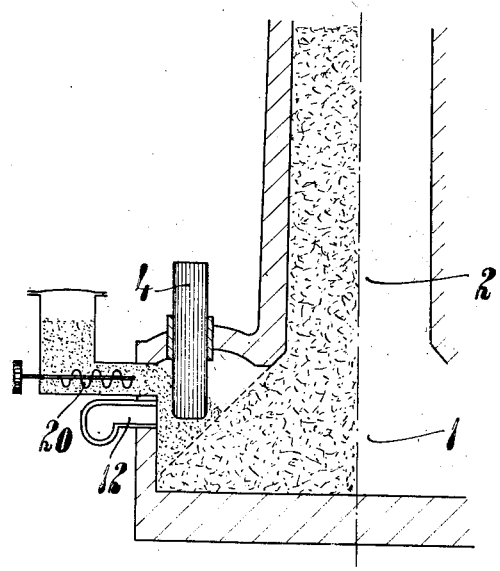

Patented Oct. 3, 1922.

1,430,971

UNITED STATES PATENT OFFICE.

EDVIN FORNANDER, OF SANDVIKEN, SWEDEN.

METHOD OF AND MEANS FOR REDUCING ORES IN ELECTRIC BLAST FURNACES.

Application filed April 14, 1922. Serial No. 552,661.

*To all whom it may concern:*

Be it known that I, EDVIN FORNANDER, a citizen of the Kingdom of Sweden, residing at Sandviken, Sweden, have invented new and useful Improvements in Methods of and Means for Reducing Ores in Electric Blast Furnaces, of which the following is a specification.

This invention relates to the reduction of ores in electric blast furnaces and has for its object to provide an improved method of and an improved furnace for effecting such reduction, whereby it is possible to more effectively utilize the reducing agent and to effect saving both of coal and of electrical energy.

In most of the electric furnaces as at present on use for reducing ores or for producing melted iron and in which an attempt is made to utilize the reducing power of the gases to some extent at least, it is a common practice to mix the reducing material with the ore already in connection with the charging operation. An inconvenience inherent to such furnaces consists, however, in that the carbonic acid produced as a result of the reduction is liable to and has also opportunity to react with carbon and regenerate carbonic oxide according to the formula:

$$CO_2 + C = 2CO.$$

This tendency of the carbonic acid to form carbonic oxide in the presence of carbon will be greatest at the temperatures that are the most favorable ones for the reduction of the iron ore with carbonic oxide, that is approximately 800–1000° C. 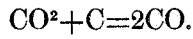 In order to avoid said inconvenience and enable a more effective utilization of the carbonic oxide of the gas for the process it has already been proposed to only charge the ore together with the necessary limestone and the like at the top of the furnace shaft and to supply the reducing material first at a lower level.

This invention therefore, consists in a method of carrying out these independent introductions of ore and reducing materials, whereby the difficulties inherent with the carrying out of the supplying methods as hitherto proposed are avoided while at the same time certain other advantages are obtained.

Electrical blast furnaces of well known construction having a reduction shaft show successively and comparatively rapidly falling temperatures at various levels of the shaft as seen from the bottom thereof. The furnace thus suffers from the drawback that the temperature referred to above as the most effective one for the reduction by means of carbonic oxide exists in a small section or zone of the shaft only. The time during which the ore is subjected to the reducing action of the carbonic oxide at the proper temperature will consequently be much too short to permit complete utilization of the reducing power of the carbonic oxide. The method according to this invention is adapted to be carried out in a furnace of a type constructed to overcome said drawback, as it will produce a uniform and sufficiently high temperature in the whole reducing shaft said shaft being at the same time constructed with such dimensions as to ensure a sufficient reduction time.

The furnace used according to this invention comprises a reduction shaft at the top of which the ore only together with limestone and the like is introduced, and an enlarged melting room at the lower end of said shaft in which melting room the prereduced ore will collect with one or more free surfaces of slope the temperature necessary for the reduction within the shaft being obtained by complete or partial combustion in the upper portion of the shaft of the carbonic oxide remaining after the reduction process has been completed.

The essential feature of this invention consists therein that solid reducing material is supplied directly to the melting room in such a way as to form a layer covering completely or partially the said free surface or surfaces of slope, yet without filling completely the space existing between the said surface or surfaces and the lid of the melting room.

Another feature of the invention consists in that part of the gases is withdrawn from the shaft and returned directly into the melting room in such a way as to be caused to through the layer of reducing material therein.

In the drawing forming part of this specification, two different forms of furnaces for carrying out the method according to this invention are shown. Fig. 1 is a vertical section through one furnace on the line A—B in Fig. 2. Fig. 2 is a horizontal section on the line C—D in Fig. 1, and Fig. 3 is a vertical section through a portion of the other furnace.

The furnace illustrated in Figs. 1 and 2 comprises the shaft 2 and the melting room 1 which is enlarged laterally at opposite sides of the shaft and is provided at the extensions at said sides with two auxiliary shafts or hoppers 3. At the top of the main shaft 2 the ore together with limestone and the like is charged. In the melting room 1 the partially or pre-reduced ore mass will collect with two free surfaces of slope. Through the auxiliary shafts or hoppers 3 solid reducing material, such as carbon, is introduced. This reducing material will collect on the said surfaces of slope of the ore as layers 15 not filling completely the space existing between the said surfaces of slope and the lid of the melting room. The hoppers 3 are preferably provided with double bells (not shown in the drawing). The numeral 4 indicates electrodes extending through the spaces 11 between the reducing material layers 15 and the lid of the melting room and engaging the said layers of reducing material. Due to the formation of a free space about each of the electrodes where it leaves the lid of the melting room, the duration of the lid will be considerably increased as there does not exist any tendency of the lid to burn away as a result of the formation of arcs between the reducing material and the electrodes. In order to prevent short circuits or too low a difference of potential between two electrodes through the carbon mass, the electrodes are so positioned as to cause the electric current on its way from one electrode to the other to always pass the pre-reduced ore mass. In the embodiment shown in Figs. 1 and 2 the electrodes are arranged in pairs. The numeral 5 indicates holes through which melted iron and slag are tapped. The carbonic oxide formed in the melting room rises through the reduction shaft and reduces the descending hot ore. At 6 tuyeres are provided through which blast air is introduced to completely or partially combust the carbonic oxide remaining in the gas after the reducing power thereof has been utilized. If the gas at the level of said tuyeres contains a greater amount of carbonic oxide than is necessary for heating the ore, part of the gas may be removed immediately below said level by appropriate means (not illustrated in the drawing). In such case, however, the amount of combustible gases will always be considerably smaller than in electrical blast furnaces as hitherto known. In the zone 7 of the shaft the charge is thus heated to the temperature most suitable for the reduction, a roasting process taking place at the same time. The top of the shaft may be provided with a closed hopper 8 as well as with one or more pipes 9 to lead off the escaping gases.

By means of channels 10 communicating with the shaft and a blower or pump 13, a gas consisting of a mixture of carbonic acid and carbonic oxide is sucked off and returned to the melting room through openings 12. Said openings may open either into the spaces 11, as shown in the drawing, or directly into the carbon layer 15. The purpose of such gas circulation is a double one. The gas having been introduced in the melting room is pressed through the incandescent carbon layer which is so positioned as to cause the gas to pass therethrough on its way to the shaft. The carbonic acid of the gas is now converted into carbonic oxide which will then enter the pre-reduced ore mass and complete the reduction of the iron. Part of the iron, however, is directly reduced with carbon in the contact surfaces between the pre-reduced ore and solid carbon. The connection of the carbonic acid with carbon to form carbonic oxide constitutes a heat consuming reaction, and this fact constitutes the other reason, why the gas containing carbonic acid is introduced into the melting room, as this will result in a cooling down of those parts of the furnace that are most subjected to destruction, that is the lid and walls surrounding the electrodes. In this connection a still further advantage may be referred to which is due to the fact that the solid reducing material forms a protecting cover into which the electrodes extend. Because the electrodes do not directly engage materials mixed with ore, the violent production of hot reaction gases, otherwise formed around the electrodes when surrounded by such materials, will be prevented to a high degree. Such gases would otherwise suddenly rise from the material surrounding the electrodes as well as along with said electrodes and would act destroying both on said electrodes and on the brickwork surrounding same.

The furnace shown in Fig. 3 likewise comprises a shaft 2 through which ore, limestone and the like are charged, and an enlarged melting room 1. The carbon or other reducing material is supplied substantially horizontally into the melting room by means of conveying worms 20, one of which is shown in the drawing. The electrodes 4 extend vertically through the lid into the free spaces above the surfaces of slope of the ore. Said surfaces of slope are to a certain extent covered by the carbon. The circulation of the gas is the same as that described in connection with the embodiment shown in Figs. 1 and 2, though the pipe therefor is not shown, but only one opening 12.

It should be understood that the invention may be carried out in other ways than those above described and by means of other installations than those shown in the drawings without departing from the principle of the invention.

What I claim as new is:—

1. A method of reducing ores in an electric blast furnace having a reducing shaft and a laterally enlarged melting room at the lower end of said shaft, which consists in charging ore, limestone and analogous substances at the top of said shaft, which mass will descend through the shaft and collect in the melting room with free surfaces of slope, supplying reducing material directly into said melting room in such a way as to cause said reducing material to form a covering layer on said surfaces of slope while leaving a free space between itself and the lid of the melting room, and removing part of the gases formed in the shaft and returning said part directly to the melting room in such a way as to cause the gas to pass through the layer of reducing material therein.

2. A furnace for carrying out the reduction of ores, comprising a reducing shaft, a melting room at the lower end of said shaft having lateral extensions, means for supplying reducing materials directly into said extended portions of the melting room, electrodes extending into said melting room through openings independent of said supplying means, and means for returning gases from the shaft and to the melting room.

In testimony whereof I have signed my name.

EDVIN FORNANDER.